Oct. 27, 1970   M. ROTHSTEIN   3,536,568
SEALING AND/OR SEVERING DEVICE FOR PLASTIC FILMS
Filed June 10, 1968   3 Sheets-Sheet 1

INVENTOR.
Milton Rothstein
BY
Johnson and Kline
ATTORNEYS

Oct. 27, 1970   M. ROTHSTEIN   3,536,568
SEALING AND/OR SEVERING DEVICE FOR PLASTIC FILMS
Filed June 10, 1968   3 Sheets-Sheet 2
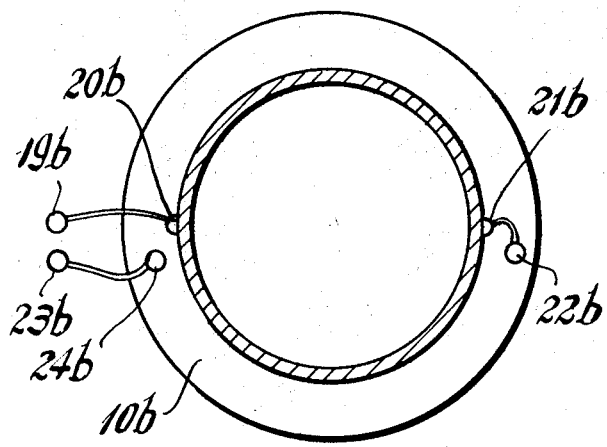
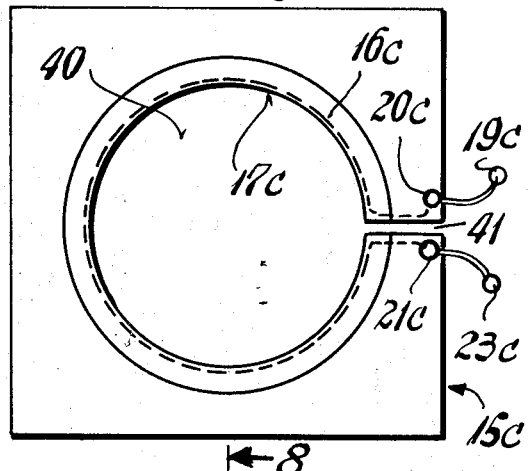
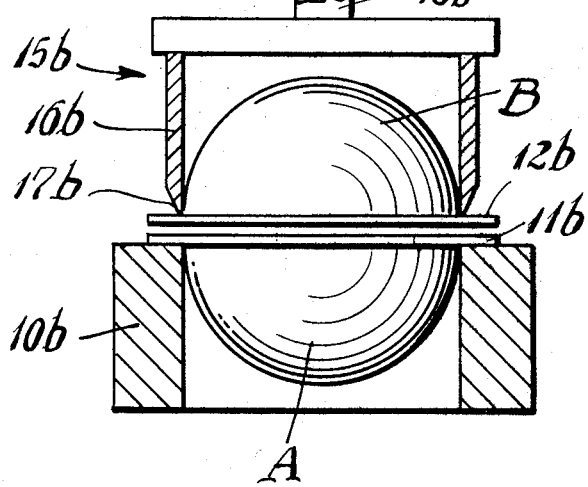
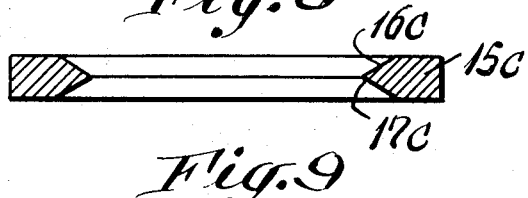
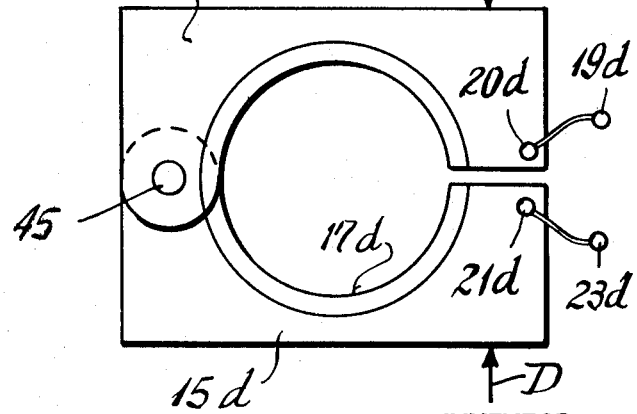
INVENTOR.
Milton Rothstein
BY
Johnson and Kline
ATTORNEYS

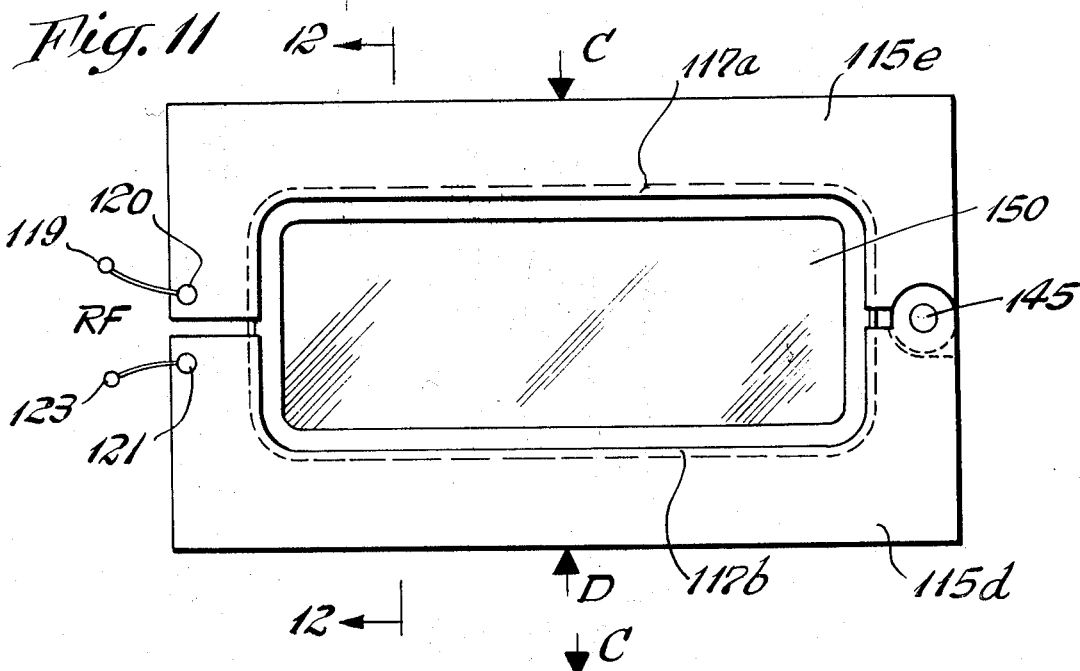
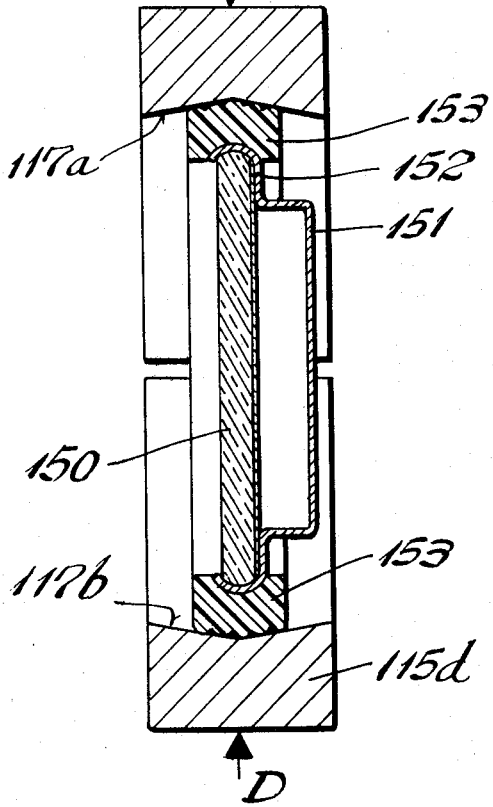

United States Patent Office 3,536,568
Patented Oct. 27, 1970

3,536,568
SEALING AND/OR SEVERING DEVICE
FOR PLASTIC FILMS
Milton Rothstein, East Williston, N.Y., assignor to
Willcox & Gibbs, Inc., New York, N.Y., a corporation
of New York
Continuation-in-part of application Ser. No. 600,157,
Dec. 8, 1966. This application June 10, 1968, Ser.
No. 736,548
Int. Cl. B32b 31/18
U.S. Cl. 156—515
12 Claims

ABSTRACT OF THE DISCLOSURE

There is herein disclosed a device for sealing and/or severing films having a rigid heated die means of electrically conducting material, and more particularly cold rolled steel. The device is provided with a relatively narrow film-engaging edge of the desired configuration which, when heated by high frequency electrical current and pressed against the films will act on the film to soften it, polymerize it, weld or bond to seal it and/or sever it. This is particularly useful when a low loss plastic film is disposed over the cooperating base member.

---

This application is a continuation-in-part of my application Ser. No. 600,157 filed Dec. 8, 1966, now abandoned.

A highly efficient sealing and/or severing die means is provided by the present invention by utilizing a base member and a cooperating rigid die member of electrical conducting material with the die member having a narrow film-engaging portion of the desired configuration. By energizing the film-engaging portion of the die member with high frequency electrical current, it will, because of the skin effect, cause the edge portion to heat sufficiently without the necessity of heating the whole die member, to effectively seal and/or sever the films. When the edge portion of the rigid die member is energized by said current, it will be heated quickly without expansion or distortion of the die member. It will also cool quickly when the current is turned off, because only a small section has been heated and the mass of the rigid die member is relatively cool and can even be provided with cooling means as required.

A feature of the invention resides in the fact that the rigid die member can be made in any desired configuration, with a narrow film-engaging edge, of a width sufficient to produce the required sealing or severing, and which will hold its shape and will not distort in use as is the case with ribbon or wire dies now used for this purpose.

The present invention is particularly useful to seal or sever irregular shapes with great accuracy since it holds the shape throughout use.

Other features and advantages of the invention will be apparent from the specification and claims when considered in connection with the accompanying drawings in which:

FIG. 5 is a plan view partly in section, of another form of the invention.

FIG. 6 is a sectional view of the die of FIG. 5.

FIG. 7 is a plan view of another form of the invention.

FIG. 8 is a longitudinal section along line 8—8 of FIG. 7.

FIG. 9 is a schematic view showing sealing of a cap to a container with the die means of FIG. 7.

FIG. 10 is a view of a modification of the die of FIG. 7.

FIG. 11 is a plan view of another form of the invention.

FIG. 12 is a sectional view taken on line 12—12 of FIG. 11.

The present invention is an improvement over and may be used wherever heated dies have heretofore been used to act on thermo-responsive material in which the dies comprise either a thin ribbon of metal disposed in flatwise relation or a wire of metal, which wire or ribbon as a whole is heated by current passing therethrough and pressed into operative relation with a thermo-responsive material. However, due to the thinness of the ribbon and the flexibility of the wire it has been found that these dies are frequently bent when in use so that they are difficult to maintain and also that they will expand when they are heated and will distort, thus rendering them inaccurate in operation.

Figure 1:
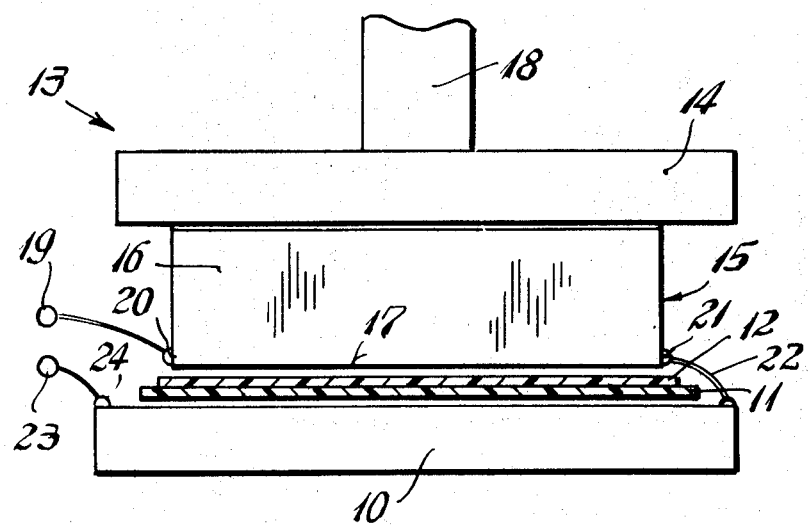
FIG. 1 is a side view of the device of the present invention.

In accordance with the present invention a base member 10 is provided which, in the form of FIG. 1 comprises a flat plate of electrically conducting material and over which one or more layers 11, 12 of film, may be disposed for sealing and/or severing. In the illustrated form of the invention, these are low loss thermoplastic films. Such films and their approximate melting points are polyethylene (250° F.), polystyrene (300° F.), polypropylene (350° F.) and FEP fluorocarbon (600° F.). Cooperating with the base member is a die element 13 comprising a pressure applying block 14 having a die member 15 provided with a narrow rigid portion 16 which, as shown in FIG. 1, projects therefrom and is provided with a relatively narrow film-engaging edge 17 of a width sufficient to produce a satisfactory sealing or severing of the plastic films. This die member is formed as a rigid element of an electrical conducting material. While the base member and die member can be formed of such materials as copper, bronze, aluminum and the like material, it has been found highly desirable to use steel for producing the die member and preferably a magnetic steel, such as cold rolled steel because of its higher resistance to the flow of high frequency electrical current. However, by judicious selection of the materials for the die member and the base member, heat may be developed equally in the top surface and at the bottom surface of the material disposed therebetween, or at the top alone, or at the bottom alone, or in any combination desired. As an example, if the die member is made of copper, aluminum, or brass, which is a good electrical conductor and the base member is made of a stainless steel which is not as good an electrical conductor, very little heat will be developed on the edge of the die member in comparison with the heat developed in the surface of the base member.

When the die and base member are energized by high frequency current, the current will pass along the film-engaging edge and the adjacent surfaces of the base member so that there is substantially no current in the die above the film-engaging edge or below the upper surface of the base member to heat these portions of the die and base member. Since only a small part of the die means is heated, the current consumption is relatively small. By controlling the time and current flow, the edge can be heated to the required temperature to fuse and seal or to sever the particular thermoplastic film being used so that an accurate and quick operation can be carried out. The die will seal two thermoplastic films together or will seal or bond thermoplastic film to another material such as cardboard, paper board or the like as in the case of the so called "bubble packages."

The die member is carried by the usual reciprocable plunger 1 in a press (not shown) to be moved into and out of engagement with the plastic film disposed over the base member.

In order to energize the device, a source of high frequency electrical current, such as a RF generator, has one terminal 19 connected to one end 20 of the portion 16 of the die member 15 adjacent the film-engaging edge thereof. The other end 21 of the portion 16 of the die member is connected adjacent the film-engaging edge thereof by a strap 22 to the adjacent base member. The other terminal 23 of the high frequency source is connected to the base member at 24 adjacent the first end of the die member, thus producing a loop circuit for the high frequency current to traverse. As the current traverses the circuit, due to the skin effect, it will cause the film-engaging edge to become quickly heated to the required heat so that it can, when pressed against the film, seal and/or sever the film.

Figure 2:
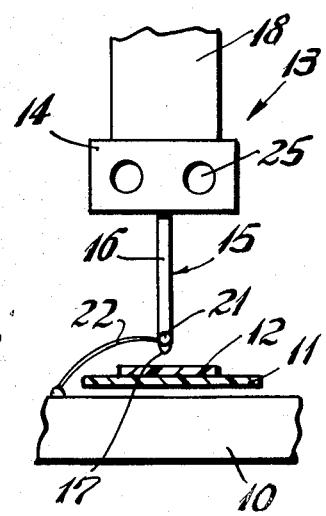
FIG. 2 is an end view of FIG. 1.

That portion 16 of the die member above the lower edge 17 is not heated, and its mass can absorb heat from the heated edge. As soon as the energization of the die member is turned off the film-engaging edge of the die will quickly cool and will hold the plies together, without the melting effect of the heat, to enable the seal to cool and be complete. If desired to more quickly cool the die member a cooling means may be connected to the die member. While this may be in the form of tubes secured to the portion 16, in the herein illustrated form of the invention passages 25 are formed in the base 14 of the die member as shown in FIG. 2 to receive a suitable cooling medium.

The present invention because of the rigidity of the die member and the low mass of the edge portion being heated will not substantially expand and be distorted as it is heated. Also because of the rigidity of the die member, it will not readily bend or deflect in use, thus insuring accurate sealing and/or severing of the plastic film material during the operation of the device.

Figure 3:
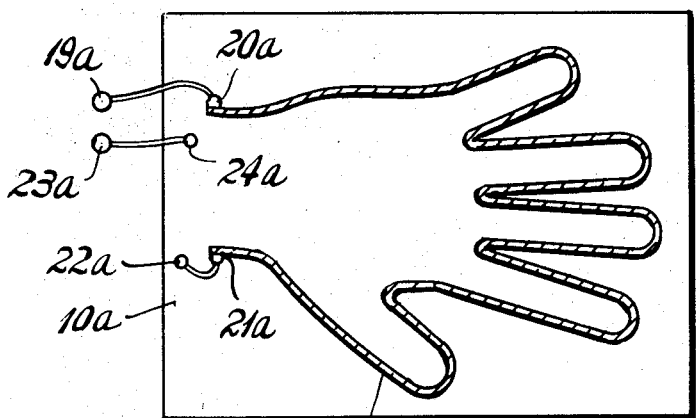
FIG. 3 is a plan view partly in section of a die means for sealing and severing a glove.

It is within the scope of the present invention to provide for sealing or severing of articles of irregular shape formed from thermoplastic films of varying thickness. For example, the die member 16a can be formed with a configuration of a glove as shown in FIG. 3, in which the end 20a of the portion 16a of the die adjacent the film-engaging edge thereof is connected to the terminal 19a of the high frequency electrical generator and the other end 21a of the portion 16a of the die adjacent the film-engaging edge thereof is connected to the base 10a by a strap 22a. The other terminal 23a of the high frequency electrical generator is connected to the base at 24a adjacent the first end of the portion of the die member, thus completing the loop circuit for this operation. The glove is but one example of the irregular shapes which may be sealed and/or severed by the present invention.

In some instances it may be desired to provide buffer strips between the thermoplastic film and the base member and die member to prevent sticking of the members to the plastic during a sealing and/or severing operation. Such an arrangement is shown in the sectional view of FIG. 4 wherein a layer 30 of buffer material such as Teflon, silicone rubber, or the like which will not melt at the sealing or severing temperature is used. Similarly the base member can have a buffer layer 31 of Teflon, silicone rubber, or a hard material such as phenolic laminated paper or the like material disposed thereover. These buffer layers engage the films 11, 12 and in addition to preventing sticking, also tend to equalize the pressures of the die means resulting in a more accurate seal although this is not too great a problem where the rigid, rugged dies of the present invention are employed because they can be accurately made to provide the required film-engaging surfaces to produce the desired sealing and/or severing pressure distribution.

The present invention is not limited to plastic films in planar relation but can be used to sever and/or seal such films when shaped or formed into three dimensional articles. For example as shown in FIGS. 5 and 6 the present invention is shown as sealing and severing the flanges on a pair of hemispherically shaped plastic films to form a sphere. The base member 10b is in the form of a hollow cylinder or an annulus having an aperture in the center to receive and support a hemisphere A having a flange 11b. The die member 15b comprises a narrow rigid die portion 16b in the form of a hollow cylinder or an annulus which has a narrow film-engaging edge 17b. The die member 15b surrounds the hemisphere B having flange 12b superposed on the flange 11b. The die member is carried by the usual plunger 18b and is movable to and from sealing and/or severing engagement with the flanges 11b, 12b supported on the base member 10b, the plunger being actuated and controlled by the usual means (not shown). The high frequency electrical generator has one terminal 19b connected to the die member at 20b adjacent the edge 17b. The opposite portion 21b on the die member adjacent the film-engaging edge is connected to the adjacent base member 10b by a strap 22b. The other terminal 23b of the high frequency generator is connected to the base member 10b at 24b adjacent the portion 20b thus forming a closed loop for the current which will divide at the point 20b and travel in the opposite directions along the film-engaging edges 17b to the point 21b and back through the cooperating surface of the base member 10b to point 24b.

When the die means is energized by said current it will quickly heat the film-engaging portions to the required temperature as determined by the material and operation involved so that when brought together the die means will join the hemispheres by fusing their edges to seal them and at the same time sever any excess flange therefrom.

If it is desired to seal a plastic enclosure or cover 38 to the open end of a plastic container or tube 39 this can be accomplished by the present invention as shown in FIGS. 7 through 10. As shown in FIG. 7, a die means comprises a plate 15c of steel provided with a hole 40 of the required size. The portion 16c of the die around the hole is shaped to provide a narrow film-engaging edge 17c. As is indicated in FIG. 7, the plate has a narrow slit 41 in one side thereof extending from the hole to the outer edge of the plate, which slit is kept to a minimum so that a complete seal is effected. One terminal 19c, the high frequency generator, is connected at point 20c of the plate and the other terminal 23c is connected to the point 21c of the plate so that the current will travel as indicated by the dash lines in FIG. 7, along one side of the slit around the film-engaging edge of the aperture along the other side of the slit to the other terminal.

When it is desired to seal a cap to the container, the container 39 as shown in FIG. 9, is supported in a vertical position with its open end 39a up. The plastic cap 38, having a flange 38a to extend over the sides 39b of the container, snugly fits within the hole 40 in the plate and is moved therewith into the position wherein the flange overlaps the sides of the container. The die means is then energized and the film-engaging edge will heat sufficiently to fuse the overlapped films of the flange and container side wall and produce a satisfactory hermetic seal.

Further, if desired, the die plate 15c of FIG. 8 can be hinged at 45 as shown in FIG. 10 so that the two sections thereof 15d, 15e can be moved, when pressure is applied in the direction of the arrows C and D, into a clamping and sealing relation to produce the required seal between the side wall and flange engaged by the film-engaging edge 17d thereof when energized with high frequency current through the connections at 20d, 21d to the terminals 19d, 23d.

While the invention has been disclosed herein as used with low loss thermoplastic films, it is to be understood that it can be used with other materials such as woven, knitted or unwoven textile fabrics made of natural or synthetic fibers and that the term "film" as used herein embraces such materials. Also if desired to enhance the adhesion of the materials being sealed, suitable heat setting adhesives may be used, being applied as coatings or other treatment to the material.

Figure 4:
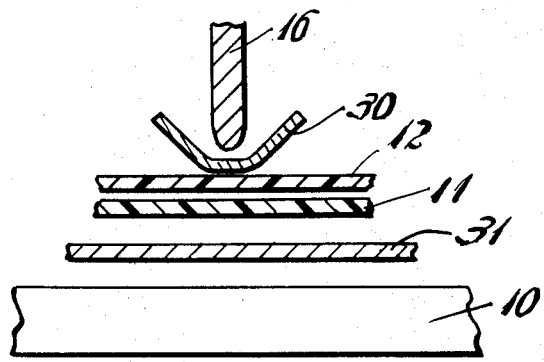
FIG. 4 is a sectional view showing buffer strips in place.

When the films are thin metal foil, they can be sealed by using a buffer, as shown in FIG. 4, of insulating material and heating the edge 17 to a temperature above the melting point of the film so as to weld the films together in a seal. For example the die edge can be quickly heated to say 1500° F. which would be above the low melting temperature of aluminum or magnesium of approximately 1200° F.

An apparatus of the type shown in FIGS. 9 and 10 can be used to bond a film of thermoplastic material to a metal surface. A specific application of such a use is shown in FIGS. 11 and 12 wherein the two die members 115e, 115d are electrically and mechanically connected by a hinge 145. The die members have work engaging surfaces 117a, 117b shaped to receive the article between them. For example the article shown is a mirror 150 (FIG. 12) having a steel frame 151 surrounding it and to the perimeter or rim 152 of which is to be bonded a protective film 153. With the article positioned between the dies, pressure is applied in the direction of arrows C, D pressing the film 153 into firm engagement with the rim. At the same time the two die members 115e, 115d, have their terminals 120, 121 connected to terminals 119 and 123 of a source of RF current. This will cause current to be conducted from terminals 119, 120, along the edge portion 117a, hinge 145, edge portion 117b to terminals 121, 123. Since in this application it is desirable to heat only the interface between the plastic and the rim of the steel frame, the die members are made of aluminum which is a relatively good conductor of RF current and the pressing edges 117a, 117b are not heated but the flow of current in said edges of the pressure applying die members induces currents in the steel frame to heat the interface between the film and preimeter of the frame and cause the protective film to soften and bond to the frame. If this protective film is of a character which will not bond satisfactorily, a heat activated adhesive can be used between the film and frame. This bonding of a film to metal is accomplished without the need for ovens and fixtures and the like for holding the articles in assembled relation. Since the heating is concentrated at the critical area only, the articles can be quickly and accurately produced without the need of a substantial cooling period as where ovens were used and/or the whole article heated.

I claim:

1. A device for sealing or severing thermoplastic films including a die member of electrically conducting material having a rigid portion provided with a narrow elongate film-engaging edge of the desired configuration and adapted to be moved into contact with the said film to seal the same, and means for heating the film-engaging edge of said die member comprising a circuit, including a source of high frequency energy having two terminals one terminal connected to one end of said portion of the die adjacent said film-engaging edge thereof and a remote portion of said die adjacent the film-engaging edge thereof being electrically connected to the other terminal to cause the current to flow along said edge to quickly heat said film-engaging edge of said portion when the circuit is energized, whereby the film is readily severed or sealed in the desired configuration in response to the heated die being pressed against the film.

2. The invention as defined in claim 1 wherein there is a pressure applying block from which said rigid portion projects.

3. The invention as defined in claim 1 wherein the rigid portion of the die member is shaped to the desired configuration and has a relatively thin cross-section to provide for a minimum heat storage whereby the film-engaging portion thereof quickly cools upon deenergization thereof.

4. The invention as defined in claim 1 wherein the die member comprises a rigid plate having an aperture and a slit communicating therewith, the edge of the plate surrounding the aperture being shaped to provide said narrow film-engaging edge.

5. The invention as defined in claim 4 wherein said rigid plate is formed in two parts hinged together opposite said slit and said film-engaging edge is movable laterally into and out of sealing relation.

6. A device for sealing or severing plastic films comprising a base member of electrically conducting material over which the film is positioned and a cooperating rigid die of electrically conducting material provided with a portion forming a narrow elongate film-engaging edge of the desired configuration to be moved into contact with the said film to press said film against said base, and means for heating the film-engaging edge of said die comprising a circuit, including a source of RF energy, having one terminal connected to one end of said portion of the die adjacent said film-engaging edge thereof; a remote portion of said die adjacent the film-engaging edge thereof being electrically connected to an adjacent portion of said base member and the other terminal connected to the base member adjacent the first end of said portion to cause current to flow along said edge and quickly heat said film-engaging edge of said portion and portion of the base member cooperating therewith, when the circuit is energized, whereby the film is readily severed or sealed in the desired configuration in response to the heated die being pressed against the film.

7. The invention as defined in claim 6 wherein said base and die members are formed of steel.

8. The invention as defined in claim 6 wherein said rigid portion of the die member provides means for quickly dissipating heat from said heated film-engaging edge whereby said film-engaging edge cools quickly upon deenergization of said circuit.

9. The invention as defined in claim 6 wherein the base member comprises a rigid hollow cylinder having an end surface to support a film and said die member comprises a rigid hollow cylinder having the edge thereof shaped to provide said narrow film-engaging edge, said hollow cylinders receiving shaped film with flanges, with the flanges disposed between said end surface and film-engaging edge whereby said shaped films and flanges are sealed and severed.

10. A heated die device movable into engagement with and acting upon a heat-responsive material including a die member of electrically conducting material having a rigid portion provided with a narrow elongate material-engaging edge of the desired configuration and adapted to be moved into contact with the surface of said material to act thereon, and means for heating the material-engaging edge of said die member comprising a circuit, including a source of high frequency energy having two terminals, one terminal connected to one end of said portion of the die adjacent said material-engaging edge thereof and a remote portion of said die adjacent the material-engaging edge thereof being electrically connected to the other terminal to cause the current to flow along said edge to quickly heat said material-engaging edge of said portion when the circuit is energized to act upon the material in the desired configuration in response to the heated die being pressed against the material.

11. A device for sealing or severing thermoplastic films including a die member of electrically conducting material having a rigid portion provided with a narrow elongate film-engaging edge of the desired configuration and adapted to be moved into contact with the said film, and means for connecting said die member to a source of RF energy having two terminals, one terminal connected to one end of said portion of the die adjacent said film-engaging edge thereof and a remote portion of said die adjacent the film-engaging edge thereof being electrically connected to the other terminal to cause the current to flow along said film-engaging edge of said portion when the circuit is energized, whereby the film is readily severed or sealed in the desired configuration in response to the die having the RF current in the edge thereof being pressed against the film.

12. A device for bonding a thermoplastic strip to a metal surface comprising a pair of dies each provided with a tapered narrow strip-engaging edge; means moving said dies to cause said edge to move into engagement with said thermoplastic material and press said material against said metal surface; connecting said dies to a source of RF current to cause current to flow in the edges thereof, said dies being of a material which is a good conductor of RF current, the current flowing in said dies inducing a heating current in the metal to heat the surface of the metal and cause the plastic material to be adhered thereto.

References Cited

UNITED STATES PATENTS

| | | | |
|---|---|---|---|
| 2,542,702 | 2/1951 | Prow | 219—10.53 |
| 2,721,600 | 10/1955 | Perryman | 156—273 |
| 2,914,109 | 11/1959 | Hsu et al. | 156—273 X |
| 3,028,576 | 4/1962 | Gerard | 156—515 X |
| 3,099,596 | 7/1963 | Prew | 156—380 |
| 3,118,040 | 1/1964 | Stanley | 219—10.53 X |
| 3,144,372 | 8/1964 | Peterson et al. | 156—251 |
| 3,238,346 | 3/1966 | Savko | 219—10.53 |
| 3,378,423 | 4/1968 | Polk et al. | 156—273 |

VERLIN R. PENDEGRASS, Primary Examiner

U.S. Cl. X.R.

219—10.53